United States Patent
Patton et al.

(10) Patent No.: US 10,250,623 B1
(45) Date of Patent: Apr. 2, 2019

(54) GENERATING ANALYTICAL DATA FROM DETECTION EVENTS OF MALICIOUS OBJECTS

(71) Applicant: Malwarebytes Inc., Santa Clara, CA (US)

(72) Inventors: Mark William Patton, San Jose, CA (US); Darren Kazuo Chinen, Fremont, CA (US); Braydon Michael Davis, Danville, CA (US); Ragesh Damodaran, Santa Clara, CA (US); Manikandan Vellore Muneeswaran, Santa Clara, CA (US); Vijay Arumugam Velayutham, San Jose, CA (US)

(73) Assignee: Malwarebytes, Inc., Santa Clara, CA (US)

( * ) Notice: Subject to any disclaimer, the term of this patent is extended or adjusted under 35 U.S.C. 154(b) by 0 days.

(21) Appl. No.: 15/838,285

(22) Filed: Dec. 11, 2017

(51) Int. Cl.
*H04L 29/06* (2006.01)

(52) U.S. Cl.
CPC ........ *H04L 63/1416* (2013.01); *H04L 63/145* (2013.01)

(58) Field of Classification Search
None
See application file for complete search history.

(56) References Cited

U.S. PATENT DOCUMENTS

| | | | |
|---|---|---|---|
| 7,496,960 B1* | 2/2009 | Chen | G06F 21/56 726/22 |
| 9,043,894 B1* | 5/2015 | Dennison | G06F 21/552 726/11 |
| 2003/0157930 A1* | 8/2003 | Morota | G06F 21/564 455/418 |
| 2008/0196104 A1* | 8/2008 | Tuvell | H04L 51/12 726/24 |
| 2009/0064335 A1* | 3/2009 | Sinn | G06F 21/562 726/24 |
| 2011/0061089 A1* | 3/2011 | O'Sullivan | H04L 63/102 726/1 |
| 2015/0269379 A1* | 9/2015 | Ramzan | G06F 21/55 726/23 |

* cited by examiner

*Primary Examiner* — Henry Tsang
(74) *Attorney, Agent, or Firm* — Fenwick & West LLP

(57) ABSTRACT

A security server tracks malicious objects detected by malware detection applications that scan for malicious objects on clients. The security server also receives client information from the clients indicating client states. The client state describes one or more protection applications executing on the client that seek to identify and prevent malicious objects from taking malicious actions based on real-time monitoring. Thus, the security server may identify when the protection application fails to detect a malicious object. In addition, the security server maps detection events of malicious objects with corresponding client states to generate aggregate detection information for a population of clients. Analytical data can be derived from the aggregate detection information to identify trends useful for evaluating different types of protection applications. Furthermore, the security server may initiate automated actions based on the identified trends to improve detection and remediation of the malicious objects on the clients.

20 Claims, 4 Drawing Sheets

300

Receive client information indicating a client state from a malware detection application
302

Receive a new detection event describing a malicious object detected by the malware detection application
304

Map the new detection event to the client state
306

Generate aggregate detection information by aggregating the new detection event with historical detection events
308

Provide the aggregate detection information for presentation
310

Determine a geolocation associated with a client using a client identifier indicated by client information
402

Store an association between a new detection event and the geolocation
404

Convert the geolocation to coordinates on an image of a map, responsive to the new detection event
406

Generate a visual indicator of the new detection event at the coordinates on the image of the map
408

GENERATING ANALYTICAL DATA FROM DETECTION EVENTS OF MALICIOUS OBJECTS

FIELD OF ART

The present disclosure generally relates to computer security and more specifically to detecting malicious software objects.

BACKGROUND

Malicious objects, also known as malware, may perform malicious operations on clients. For example, malicious objects on an infected client may disrupt computing operations, gather sensitive information, present unwanted content, gain access to private information, or cause other types of undesirable effects on the infected client. To mitigate or guard against malicious objects, protection applications monitor active processes on a client and seek to detect and prevent the malicious objects from taking malicious action. However, because the threats from malicious objects can change over time, protection applications may occasionally fail to detect a malicious object on a given client. For example, a protection application may be outdated and thus unable to identify new strains of malicious objects. Lack of knowledge about failures in protection applications leads to decreased security on the clients.

SUMMARY

A method generates aggregate detection information of malicious objects detected by malware detection applications on clients. In an embodiment, client information indicating a client state describing at least one protection application executing on a client is received from a malware detection application executing on the client. A new detection event describing a malicious object on the client detected by the malware detection application when the client is in the client state is received from the malware detection application. The new detection event is mapped to the client state when the malicious object was detected for storage in a detections database. Aggregate detection information is generated by aggregating the new detection event with historical detection events stored in the detections database for a set of clients executing instances of the malware detection application. The aggregate detection information indicates a count of detection events for the malicious object occurring from clients executing the at least one protection application. The aggregate detection information is provided to an administrative client for presentation.

In some embodiments, a geolocation associated with the client is determined using a client identifier indicated by the client information. An association between the new detection event and the geolocation is stored. The geolocation may be converted to coordinates on an image of a map responsive to the new detection event. A visual indicator of the new detection event may be generated at the coordinate on the image of the map.

In another embodiment, a non-transitory computer-readable storage medium stores instructions that when executed by a processor causes the processor to execute the above-described method.

In yet another embodiment, a computer system includes a processor and a non-transitory computer-readable storage medium that stores instructions for executing the above-described method.

BRIEF DESCRIPTION OF THE DRAWINGS

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

FIG. 3 is a flowchart illustrating an embodiment of a process for providing aggregate detection information using historical detection events.

FIG. 4 is a flowchart illustrating an embodiment of a process for generating a user interface to present geolocation information of detection events.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

A client may execute one or more protection applications as well as a malware detection application. A protection application performs real-time protection by monitoring a client for activity indicative of malware, which is also referred to herein as a "malicious object." In various embodiments, types of malicious objects include, but are not limited to, adware, bots, bugs, ransomware, rootkits, spyware, Trojan horses, viruses, and worms. For example, upon downloading a file, opening a file, executing a file, accessing a web page, or taking another action, the protection application may monitor the action to detect whether it may cause installation of a malicious object. Responsive to detecting suspicious activity, a protection application can prevent the malicious object from infecting the client.

A malware detection application, in contrast, performs scans on clients to detect malicious objects that have already infected the clients including those that went undetected by the protection applications. Further, the malware detection application may provide detection events describing the detected malicious objects along with client information to a security server. The security server aggregates information received from malware detection applications running on a population of clients to generate analytical data useful for remediating and preventing further spread of the detected malicious objects. For instance, because the malware detection application 140 reports malicious objects that go undetected by the protection application, the analytical data may characterize the performance of a protection application in preventing installation of malicious objects. The security server may furthermore generate analytical information about types of malicious objects that a protection application fails to detect and aggregate the analytical information to identify both short term and long term trends in the performance of different protection applications. The security server may furthermore utilize the detected trends to automate actions to enable the population of clients to better protect against threats of malicious objects.

Figure 1:
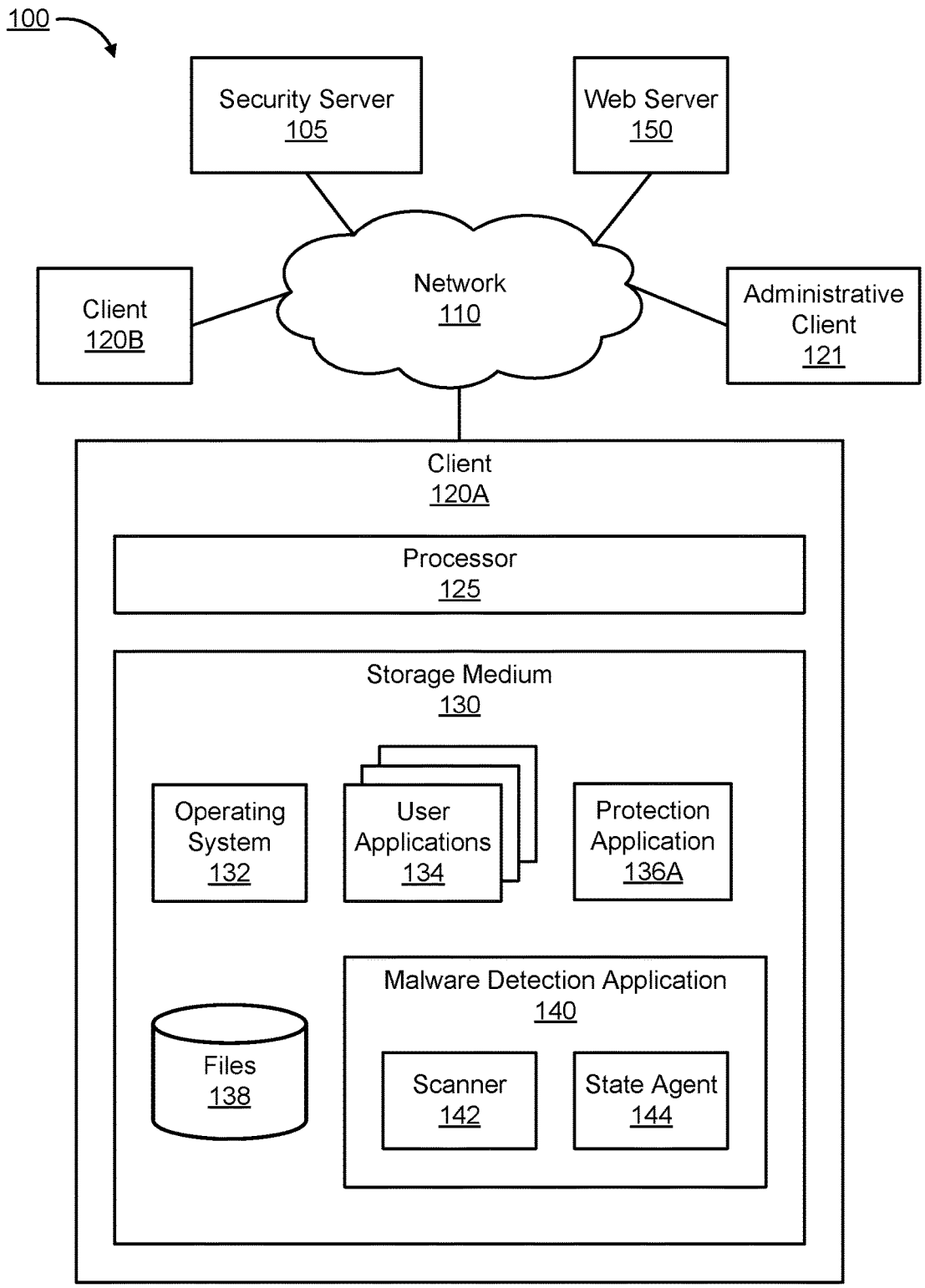
FIG. 1 is a system diagram illustrating an example embodiment of an environment in which a malware detection application executes.

FIG. 1 is a system diagram illustrating an example embodiment of an environment 100 in which a malware detection application 140 executes. The system environment 100 comprises a security server 105, a network 110, various clients 120A and 120B (collectively referenced herein as clients 120 or a client 120), administrative client 121, and a web server 150. For simplicity and clarity, one security server 105, one web server 150, and a limited number of clients 120 and administrative clients 121 are shown; however, other embodiments may include different numbers of security servers 105, clients 120, administrative clients 121, and web servers 150. Furthermore, the system environment 100 may include different or additional entities.

The security server 105 and the web server 150 (collectively referenced herein as servers) are computer systems configured to store, receive, and transmit data to clients 120 and administrative clients 121 or to other servers via the network 110. A server may include a singular computing system, such as a single computer, or a network of computing systems, such as a data center or a distributed computing system. The server may receive requests for data from clients 120 and respond by transmitting the requested data to the clients 120.

The web server 150 may comprise, for example, a website server that provides web content for viewing on clients 120 or a file server that provides files that can be downloaded by the clients 120. The web server 150 is a potential sources of applications (e.g., user applications 134, protection applications 136, or malware detection applications 140) or a source of malicious objects that may become installed on one or more clients 120. For example, as a user downloads a user application 134 from a website or file server, a malicious object associated with the user application 134 may become installed on a client 120, often without the user's knowledge. Moreover, clients 120 may also become infected with a malicious object indirectly from a web server 150. For instance, a malicious object may originate from a given web server 150 and spreads from client-to-client (e.g., by generating copies of malicious objects) to impact a population of clients 120.

The network 110 represents the communication pathways between the security server 105, clients 120, administrative clients 121, and web servers 150. In one embodiment, the network 110 is the Internet. The network 110 can also utilize dedicated or private communications links that are not necessarily part of the Internet. In one embodiment, the network 110 uses standard communications technologies and/or protocols.

Each client 120 (or administrative client 121) comprises one or more computing devices capable of processing data as well as transmitting and receiving data via a network 110. For example, a client 120 may be a desktop computer, a laptop computer, a mobile phone, a tablet computing device, an Internet of Things (IoT) device, or any other device having computing and data communication capabilities. Each client 120 includes a processor 125 for manipulating and processing data, and a storage medium 130 for storing data, for example, in files 138, and program instructions associated with various applications. The storage medium 130 may include both volatile memory (e.g., random access memory) and non-volatile storage memory such as hard disks, flash memory, and external memory storage devices. In addition to storing program instructions, the storage medium 130 stores various data associated with operation of applications, e.g., the operating system 132, user applications 134, protection applications 136 (e.g., protection application 136A of client 120A), and malware detection application 140. The administrative client 121 may receive information about other clients 120 such as feedback from the security server 105. In contrast with other clients 120, the administrative client 121 may not necessarily include the malware detection application 140 or all components of a malware detection application 140.

In one embodiment, the storage medium 130 comprises a non-transitory computer-readable storage medium. Various executable programs (e.g., operating system 132, user applications 134, protection applications 136, and malware detection application 140) are each embodied as computer-executable instructions stored to the non-transitory computer-readable storage medium. The instructions, when executed by the processor 125, cause the client 120 to perform the functions attributed to the programs described herein.

The operating system 132 is a specialized program that manages computer hardware resources of the client 120 and provides common services to applications of the client 120. For example, a computer's operating system 132 may manage the processor 125, storage medium 130, or other components not illustrated such as, for example, a graphics adapter, an audio adapter, network connections, disc drives, and USB slots. A mobile phone's operating system 132 may manage the processor 125, storage medium 130, display screen, keypad, dialer, wireless network connections and the like. Because many programs and executing processes compete for the limited resources provided by the processor 125, the operating system 132 may manage the processor bandwidth and timing to each requesting process. Examples of operating systems 132 include WINDOWS, MAC OS, IOS, LINUX, UBUNTU, UNIX, and ANDROID.

The user applications 134 may include applications for performing a particular set of functions, tasks, or activities for the benefit of the user. Examples of user applications 134 may include a word processor, a spreadsheet application, a web browser, or entertainment application. In some cases, a user application 132 can be a source of a malicious object that is unknowingly bundled or hidden in the user application 132. The malicious object may be installed on the client 120 when the user application 134 is installed.

A protection application 136 monitors active processes on the client 120 to detect malicious objects and prevent malicious objects from being installed on the client 120. Further, the protection application 136 may remediate detected malicious objects to prevent the malicious objects from taking malicious action. For example, the protection application 136 quarantines or removes the malicious objects from the client 120. However, in some instances, the protection applications 136 may fail to prevent certain malicious objects from infecting the respective clients 120. Such failures may be due to the protection application 136 being unable to detect the malicious object or due to the protection application 136 failing to prevent the malicious object from installing even if it is successfully detected. For example, a protection application 136 may lack sufficiently updated definitions for detecting a previously unknown malicious object. In other cases, a protection application 136 can become compromised (e.g., by malicious objects or human error), and thus is no longer able to operate properly to protect against malicious objects. Moreover, a given instance of a protection application 136 that is out-of-date, for example, missing latest definitions or signatures of known malicious objects, may not detect new versions of malicious objects. Certain malicious objects may also be designed to subvert or exploit flaws in specific types of protection applications 136.

A client 120 may include a single protection application 136 or may include two or more different types of protection applications 136 operating concurrently. Furthermore, different clients 120 may operate different types of protection applications 136. The different types of protection applications may operate according to different detection and remediation algorithms and may perform detection based on different characteristics. As a result, the different types of protection applications may achieve different levels of performance in detecting and remediating malicious objects. For example, a first type of protection application may successfully detect and remediate a particular malicious object, but a second type of protection application may fail to detect or remediate the same malicious object.

The malware detection application 140 detects and remediates malicious objects by scanning the storage medium 130 or a portion thereof. In contrast to the protection application 136, which seeks to prevent installation of the malicious objects by monitoring real-time activities on the client 120, the malware detection application 140 instead identifies malicious objects by performing a detailed scan of the storage medium 130. The malware detection application 140 may detect malicious objects using different detection definitions or algorithms than the protection application 136. Thus, the malware detection application 140 may identify malicious objects that the protection application 136 failed to detect.

The malware detection application 140 includes a scanner 142 configured to scan the storage medium 130 or portions thereof to detect malicious objects. The scanner 142 may perform the scans on a periodic basis, for instance, according to a predetermined time interval. In some embodiments, the scanner 142 identifies malicious objects using a predefined list of malicious object definitions (e.g., received from the security server 105) describing characteristics of known malicious objects. Responsive to the scanner 142 detecting a malicious object on the storage medium 130, the scanner 142 generates a detection event including relevant information about the detected malicious object. In particular, the detection event may describe a type of the malicious object detected and a memory location where the malicious object was found (e.g., a directory address on the client 120), together with a timestamp of the detection. The scanner 142 provides detection events to the security server 105 and may also store detection events locally on the client 120.

The malware detection application 140 also includes a state agent 144 configured to generate client information associated with the client 120 at a particular time instance. In particular, the client information may include a client state that describes applications (e.g., protection applications 136 and/or user applications 134) installed on the client 120 at the time instance when the client information is generated. The client state may indicate an installation location of an application, a name or version of an application, certain files 138 (e.g., shortcuts, metadata, or installation or log files) associated with the application, or a data or time when the application was last updated or executed. The client information may also include a timestamp of when the client information was obtained, as well as one or more client identifiers associated with the client 120 such as an Internet protocol (IP) address, geolocation, serial number, credentials, user information, etc. Moreover, the client information may include system information of the client 120 such as a type of the operating system 132, memory, or CPU usage, among other types of telemetry information.

The state agent 144 provides client information to the security server 105 and may also store client information locally on the client 120. Since applications may be installed, updated, or removed from the client 120 over time, the client state may vary depending on when the state agent 144 captures the client information. Thus, in some embodiments, to provide accurate monitoring of the client state, the state agent 144 generates and provides updated client information at least once or twice per day (for example, every 12 hours that the client 120 is running) to the security server 105.

The security server 105 receives detection events and client information from the clients 120. The security server 105 logs the detection events and client information and generates analytical data representing various trends associated with the detections. For example, the analytical data may reflect short term trends reflecting current threats to the clients 120 based on failures of different types of protection applications 136, and long term trends reflecting historical performance of different types of protection application 136. The security server 105 may furthermore take automated actions based on the analytical data to enable the clients 120 to better protect against malicious objects. The security server 105 is described in further detail below.

Figure 2:
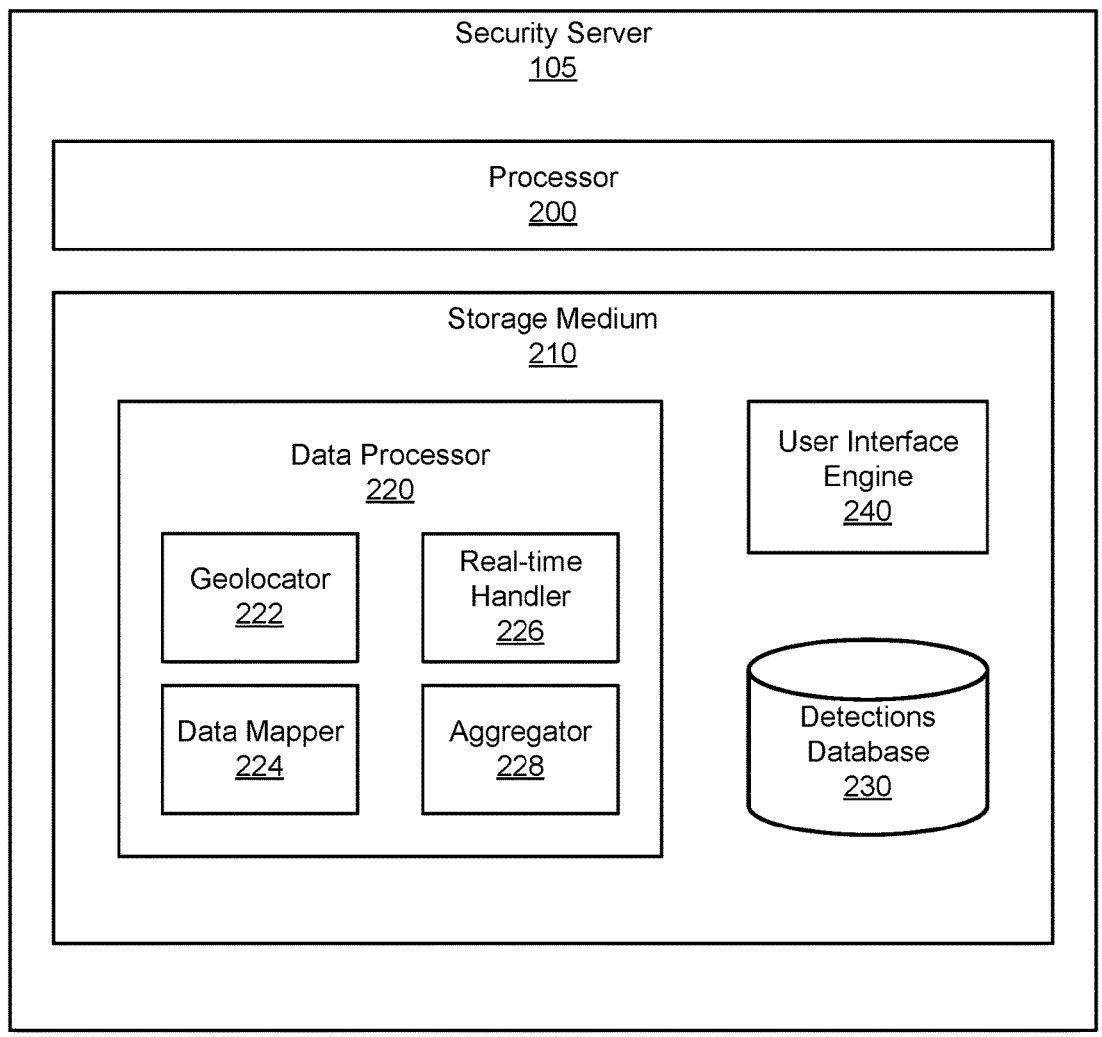
FIG. 2 is a block diagram illustrating an example embodiment of a security server.

FIG. 2 is a block diagram illustrating an example embodiment of the security server 105. The security server 105 includes a processor 200 for manipulating and processing data, and a storage medium 210 for storing data and program instructions associated with various modules. The storage medium 210 includes a data processor 220, a detections database 230, and a user interface engine 240. Alternative embodiments may include different or additional modules or omit one or more of the illustrated modules.

The data processor 220 processes information from a population of clients 120 and may include a geolocator 222, a data mapper 224, a real-time handler 226, and an aggregator 228. The geolocator 222 receives the client information from the clients 120 and determines geolocations of the clients 120 by processing the client information. In embodiments where the client information includes an IP address of a given client 120, the geolocator 222 generates the geolocation of the given client 120, for example, using a lookup table that maps IP addresses to different geolocations. In an embodiment, the lookup table may be maintained in a database external to the security server 105 and the geolocator 222 may query the database with the IP address to obtain the geolocation. The geolocator 222 may also determine geolocations using other types of client identifiers included in client information.

The data mapper 224 receives the detection events and the client information and maps the detection events to client states corresponding to the times of the detection events. Responsive to receiving a client state of a given client 120, the data mapper 224 stores the client state in the detections database 230, for example, along with a timestamp of the client state and the determined geolocation of the given client 120 obtained from the geolocator 222. The detections database 230 may store a timestamped history of client states of clients 120, where the client state with the most recent timestamp represents the current client state of a client 120. Responsive to receiving a detection event from the given client 120, the data mapper 224 obtains a timestamp corresponding to the detection event and identifies the client state from the detections database 230 corresponding to the timestamp for the detection event. In particular, the data mapper 224 determines the last known client state of the given client 120 at the time that the detection event occurred. Thus, the data mapper 224 may retrieve the current client state, or a previous client state of the given client 120, depending on the timestamp associated with the detection event. In some embodiments, the data mapper 224 stores the mapping between the detection event, the retrieved client state, and the geolocation to the detections database 230 in the form of a detection log that logs all detection events from each of the clients 120.

The real-time handler 226 receives the mapped data (including the detection events, client state, and geolocation) from the data mapper 224. The real-time handler 226 may process the mapped data to provide real-time information to the user interface engine 240 described in further detail below. In some embodiments, the real-time handler 226 aggregates the mapped data over a relatively short period of time (e.g., last day, last hour, last minute, etc.) to provide short-term aggregate data representing recent trends in the mapped data that may be representative of performance of different protection applications 136. For example, the real-time handler 226 may process the mapped data to determine rates at which detections of a malicious object have increased or decreased in a recent time frame on clients 120 on which a particular type of protection application 136 was present. Furthermore, the real-time handler 226 may identify specific types of malicious objects that have greater than a threshold number of detections within the recent time frame on clients 120 on which a particular type of protection application 136 was present. The real-time handler 226 may furthermore determine a geographic pattern associated with detections of a particular malicious object such as identifying geographic regions in which over a threshold number of detections of a particular malicious object are detected within the time period on clients 120 on which a particular type of protection application 136 was present. The real-time handler 226 may store short-term aggregate data, mapped data, detection events, or client states in the detections database 230.

The aggregator 228 aggregates the mapped data over a long-term history (e.g., a week, month, year, or multi-year period) to generate analytical data representing long-term trends. In some embodiments, the aggregator 228 determines a total number of clients 120 on which a particular type of protection application 136 was present infected by a certain type of malicious object over the long-term history. The aggregator 228 may also determine a total number of clients 120 on which a particular type of protection application 136 was present that were infected by a malicious object traceable to a particular source (e.g., a URL or web server 150). In another embodiment, the aggregator 228 determines a total number of clients 120 on which a particular type of protection application 136 was present in which a malicious object was detected at a particular installation location on the clients 120. In some embodiments, the aggregator 228 determines a type of operating system of the client 120 according to client information and may generate separate counts for any of the analytical data discussed above for clients 120 having different operating systems. Thus, the aggregator 228 may generate feedback indicating that certain operating systems may be more vulnerable to specific types of malicious objects. The aggregator 228 may store long-term aggregate data, mapped data, detection events, or client states in the detections database 230.

Further, the aggregator 228 may identify the geographical location or time of the first detected client 120 infected by the malicious object, as well as the historical spread of the malicious object over additional clients 120. Using the first detection, the aggregator 228 may determine a length of time over which a particular type of protection application 136 has failed to detect the malicious object. The aggregator 228 may generate feedback indicating a count of detection events for malicious objects occurring during a certain period of time such as a recent duration of time or a duration of time further in the past.

The user interface engine 240 generates user interfaces to present feedback about detections of malicious objects. The data processor 220 may use an application programming interface (API) to provide information from the real-time handler 226 and the aggregator 228 to the user interface engine 240. Thus, the user interfaces may include feedback generated by the real-time handler 226 or aggregator 228, including graphical or text-based representations of the short-term trends, long-term trends, or a combination of both. In some embodiments, the user interface engine 240 maintains a browser session web socket of a client 120 to send real-time feedback for presentation on the client 120.

In an embodiment, the user interface engine 240 generates a user interface including a world or local map to show detected malicious objects missed by different protection applications 136 according to geolocation. For example, the map illustrates a geographical region and includes visual indicators at coordinate locations on the map that represent clients 120 that detected a given malicious object missed by a protection application 136. In some embodiments, the visual indicators are displayed for a certain period of time, e.g., briefly such as for several seconds or minutes following the detection. For long-term aggregated information and trends, the indicator may display a running total count of detections for the history of a malicious object. The user interface engine 240 may determine the coordinate locations (e.g., longitude and latitude) by converting geolocations determined by the geolocator 222. The map may also show a comparison of the infected clients 120 with the locations of other clients 120 for which other instances of the malware detection application 140 did not detect the given malicious object, e.g., because the other clients 120 are not infected by malicious objects. The map may be presented as an image, video, webpage, web portal, mobile application, etc. In addition, the map may be updated in real-time by the real-time handler 226 as new detection events are processed, or periodically by the aggregator 228 using batches of detection events.

The user interface engine 240 may provide the user interfaces to the clients 120 or administrative client 121 for presentation to users. Users of clients 120 may view the user interfaces to assist the users in protecting their own clients 120. Further, the user interface engine 240 may also provide user interfaces to an administrative client 121 to enable an administrator of the security server 105 to monitor the spread of malicious objects on other clients 120 and evaluate the effectiveness of the protection applications 136. Referring to the above example, a user viewing the map may track the spread of malicious objects and initiate actions to remediate the given malicious object. The user interfaces may also include playback functionality to enable users to view historical detection events, for instance, over the last seven days or month.

In some embodiments, the user interface engine 240 generates a user interface including a table or another suitable format of detection events for different categories of malicious objects as determined by the aggregator 228. In addition, the user interface may indicate which protection applications 136 were installed on clients 120 and failed to protect the clients 120 from certain malicious objects. These user interfaces may reveal that some protection applications 136 detect previously known malicious objects, but do not detect newer versions of malicious objects. Accordingly, presenting these user interfaces is advantageous because the security server 105 provides feedback for users to identify weaknesses or flaws in the protection applications 136, which helps monitor and prevent further spread of malicious objects.

In some embodiments, the security server 105 may classify the malicious objects into different categories. The security server 105 may determine a count of detection events for malicious objects across a particular category. Responsive to determining that the count is greater than a threshold value, the security server 105 may automatically send an alert to clients 120 executing a specific protection application 136 that failed to detect instances of malicious objects of that particular category. The alert may indicate performance metrics of the specific protection application 136 or information about the particular category of malicious objects. The security server 105 may also automatically send updated definitions of malicious objects or updated versions of the specific protection application 136 to the clients 120 for download. Moreover, the security server 105 may send a notification to a creator or administrator of the specific protection application 136 regarding the lack of detection.

In some embodiments, the security server 105 may automatically provide information (e.g., updated malware definitions) to infected clients 120 for removal or quarantining of malicious objects. Additionally, the security server 105 may send instructions to clients 120 within a certain network proximity (e.g., included in a local area network) from infected clients 120 to perform scans to detect and prevent potential further spread of the given malicious object. The security server 105 may furthermore predict, based on the identified trends, which clients 120 may be susceptible to a particular threat. For example, a particular set of clients 120 may be deemed particularly susceptible to a particular threat if a sufficient number of other clients 120 having similar geolocation and client state were determined to be infected. Based on the predictions, the security server 105 may automatically adjust a scanning frequency or take some other action to enable the clients 120 to better protect against the identified threat. Additionally, an alert may be automatically distributed to the clients 120 to warn users of activities (e.g., opening a particular email attachment) that may be a particular threat to the client 120. In some embodiments, a component of the security server 105 or the client 120 is updated using the aggregated information to enable the clients 120 to better protect against malicious objects. For example, the security server 105 changes the timing or priority of updates provided to the clients 120 that enable the clients 120 to remediate threats identified as being most prevalent. In another example, the security server 105 may use aggregated information to detect a true zero-day outbreak of a particular malicious object and initiate an update to a protection application 136 to detect and remediate the threat. In yet another example, the security server 105 may use aggregated information to detect false positives and provide a false positive alert to clients 120 (e.g., by determining that a detection is actually not indicative of a malicious object).

FIG. 3 is a flowchart illustrating an embodiment of a process 300 for providing aggregate detection information using historical detection events. The data processor 220 of the security server 105 receives 302, from a malware detection application 140 executing on a client 120, client information indicating a client state describing at least one protection application 136 executing on the client 120. The data processor 220 receives 304, from the malware detection application 140, a new detection event describing a malicious object on the client 120 detected by the malware detection application 140 when the client 120 is in the client state. The data mapper 224 maps 306 the new detection event to the client state when the malicious object was detected for storage in the detections database 230.

The aggregator 228 generates 308 aggregate detection information by aggregating the new detection event with historical detection events stored in the detections database 230 for a set of clients 120 executing instances of the malware detection application 140. The aggregate detection information indicates a count of detection events for the malicious object occurring from clients executing the at least one protection application 136. Additionally, the aggregate detection information may be generated using short-term aggregate data (e.g., from the real-time handler 226) and/or long-term aggregate data (e.g., from the aggregator 228). The user interface engine 240 provides 310 the aggregate detection information to an administrative client 121 for presentation. In some embodiments, the user interface engine 240 also provides feedback generated using the aggregate detection information to the client 120 for presentation, for instance, to help a user of the client 120 remediate the malicious object.

FIG. 4 is a flowchart illustrating an embodiment of a process 400 for generating a user interface to present geolocation information of detection events. In some embodiments, the security server 105 performs steps of the process 400 in conjunction with the process 300 shown in FIG. 3. The geolocator 222 of the security server 105 determines 402 a geolocation associated with the client 120 using a client identifier indicated by the client information. The data mapper 224 stores 404 an association between the new detection event and the geolocation in the detections database 230. The user interface engine 240 converts 406 the geolocation to coordinates on an image of a map responsive to the new detection event. The user interface engine 240 generates 408 a visual indicator of the new detection event at the coordinate on the image of the map. The visual indicator may include an indication of a protection application 136 executing on the client 120 at the time of the detection.

The above-described system and processes beneficially enables generation of analytical data to evaluate the effectiveness of protection applications 136. By aggregating client states and detection events of malicious objects on clients 120 by instances of malware detection applications 140, the security server 105 can track the spread of various types of malicious objects that go undetected by protection applications 136. Moreover, the security server 105 can use aggregate detection information to generate feedback for presentation on user interfaces of clients 120 or to take automated actions that enable the clients 120 to better protect against threats.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for detecting malicious objects, the method comprising:
   receiving, from a malware detection application executing on a client, client information indicating a client state describing at least one protection application executing on the client and a geolocation associated with the client;
   receiving, from the malware detection application, a new detection event describing a malicious object on the client that went undetected by the at least one protection application and was subsequently detected by the malware detection application when the client is in the client state, the new detection event further including a time associated with the new detection event;
   mapping the new detection event to the client state when the malicious object was detected for storage in a detections database;
   generating aggregate detection information by aggregating the new detection event with historical detection events stored in the detections database for a plurality of clients executing instances of the malware detection application and instances of the at least one protection application, the aggregate detection information indicating a count of detection events on the plurality of clients in which the malicious object went undetected by the respective instances of the at least one protection application and was subsequently detected by the instances of the malware detection application;
   generating a user interface displaying the count of detection events and including a control for generating a playback of the aggregate detection information, wherein in response to selection of the control, the user interface displays a sequence of indicators at coordinates of a map corresponding to respective geolocations of the historical detection events, the indicators being displayed according to the respective times associated with the historical detection events to indicate geographic spread of the malicious object on the plurality of clients; and
   providing the user interface to an administrative client for presentation.

2. The method of claim 1, further comprising:
   providing feedback generated using the aggregate detection information to the client for presentation.

3. The method of claim 1, further comprising:
   responsive to determining an updated threat for malicious objects using the aggregate detection information, modifying a priority of updates provided to the plurality of clients executing instances of the malware detection application.

4. The method of claim 1, further comprising:
   classifying malicious objects detected by the instances of the malware detection application executing on the plurality of clients into a plurality of categories for storage in the detections database;
   generating, across one of the plurality of categories, an additional count of detection events for malicious objects occurring from the clients executing the at least one protection application; and sending an alert to each of the clients responsive to determining that the additional count is greater than a threshold value, the alert indicating performance specific to the at least one protection application.

5. The method of claim 4, further comprising:
sending a notification to a creator or administrator of the at least one protection application regarding the lack of detection responsive to determining that the additional count is greater than the threshold value.

6. The method of claim 4, further comprising:
responsive to determining that the additional count is greater than the threshold value, sending a notification to each of the clients executing the at least one protection application to adjust a scanning frequency of malware detection applications.

7. The method of claim 1, wherein mapping the detection event to the client state comprises:
determining the geolocation associated with the client based on a client identifier indicated by the client information; and
storing, in the detections database, an association between the new detection event and the geolocation.

8. The method of claim 1, further comprising:
responsive to determining that the count of detection events for the malicious object is greater than a threshold value, sending an updated definition of the malicious object to the clients executing the at least one protection application.

9. The method of claim 7, wherein the geolocation is determined using an IP address of the client as the client identifier, the new detection event is stored along with the geolocation in the detections database, and the historical detection events are aggregated based at least on associated geolocations.

10. A non-transitory computer-readable storage medium storing instructions for detecting malicious objects, the instructions when executed by a processor causing the processor to perform steps including:
receiving, from a malware detection application executing on a client, client information indicating a client state describing at least one protection application executing on the client and a geolocation associated with the client;
receiving, from the malware detection application, a new detection event describing a malicious object on the client that went undetected by the at least one protection application and was subsequently detected by the malware detection application when the client is in the client state, the new detection event further including a time associated with the new detection event;
mapping the new detection event to the client state when the malicious object was detected for storage in a detections database;
generating aggregate detection information by aggregating the new detection event with historical detection events stored in the detections database for a plurality of clients executing instances of the malware detection application and instances of the at least one protection application, the aggregate detection information indicating a count of detection events on the plurality of clients in which the malicious object went undetected by the respective instances of the at least one protection application and was subsequently detected by the instances of the malware detection application;
generating a user interface displaying the count of detection events and including a control for generating a playback of the aggregate detection information, wherein in response to selection of the control, the user interface displays a sequence of indicators at coordinates of a map corresponding to respective geolocations of the historical detection events, the indicators being displayed according to the respective times associated with the historical detection events to indicate geographic spread of the malicious object on the plurality of clients; and
providing the user interface to an administrative client for presentation.

11. The computer-readable storage medium of claim 10, comprising further instructions that when executed by the processor cause the processor to perform steps including:
responsive to determining an updated threat for malicious objects using the aggregate detection information, modifying a priority of updates provided to the plurality of clients executing instances of the malware detection application.

12. The computer-readable storage medium of claim 10, comprising further instructions that when executed by the processor cause the processor to perform steps including:
classifying malicious objects detected by the instances of the malware detection application executing on the plurality of clients into a plurality of categories for storage in the detections database;
generating, across one of the plurality of categories, an additional count of detection events for malicious objects occurring from the clients executing the at least one protection application; and
sending an alert to each of the clients responsive to determining that the additional count is greater than a threshold value, the alert indicating performance specific to the at least one protection application.

13. The computer-readable storage medium of claim 12, comprising further instructions that when executed by the processor cause the processor to perform steps including:
responsive to determining that the additional count is greater than the threshold value, sending a notification to each of the clients executing the at least one protection application to adjust a scanning frequency of malware detection applications.

14. The computer-readable storage medium of claim 10, wherein mapping the detection event to the client state comprises:
determining the geolocation associated with the client based on a client identifier indicated by the client information; and
storing, in the detections database, an association between the new detection event and the geolocation.

15. The computer-readable storage medium of claim 10, comprising further instructions that when executed by the processor cause the processor to perform steps including:
responsive to determining that the count of detection events for the malicious object is greater than a threshold value, sending an updated definition of the malicious object to the clients executing the at least one protection application.

16. A computing system comprising:
a processor; and
a non-transitory computer-readable storage medium storing instructions for detecting malicious objects, the instructions when executed by the processor causing the processor to perform steps including:
receiving, from a malware detection application executing on a client, client information indicating a client state describing at least one protection application executing on the client and a geolocation associated with the client;

receiving, from the malware detection application, a new detection event describing a malicious object on the client that went undetected by the at least one protection application and was subsequently detected by the malware detection application when the client is in the client state, the new detection event further including a time associated with the new detection event;

mapping the new detection event to the client state when the malicious object was detected for storage in a detections database;

generating aggregate detection information by aggregating the new detection event with historical detection events stored in the detections database for a plurality of clients executing instances of the malware detection application and instances of the at least one protection application, the aggregate detection information indicating a count of detection events on the plurality of clients in which the malicious object went undetected by the respective instances of the at least one protection application and was subsequently detected by the instances of the malware detection application;

generating a user interface displaying the count of detection events and including a control for generating a playback of the aggregate detection information, wherein in response to selection of the control, the user interface displays a sequence of indicators at coordinates of a map corresponding to respective geolocations of the historical detection events, the indicators being displayed according to the respective times associated with the historical detection events to indicate geographic spread of the malicious object on the plurality of clients; and providing the user interface to an administrative client for presentation.

17. The computing system of claim 16, wherein the computer-readable storage medium comprises further instructions that when executed by the processor cause the processor to perform steps including:

responsive to determining an updated threat for malicious objects using the aggregate detection information, modifying a priority of updates provided to the plurality of clients executing instances of the malware detection application.

18. The computing system of claim 16, wherein the computer-readable storage medium comprises further instructions that when executed by the processor cause the processor to perform steps including:

classifying malicious objects detected by the instances of the malware detection application executing on the plurality of clients into a plurality of categories for storage in the detections database;

generating, across one of the plurality of categories, an additional count of detection events for malicious objects occurring from the clients executing the at least one protection application; and sending an alert to each of the clients responsive to determining that the additional count is greater than a threshold value, the alert indicating performance specific to the at least one protection application.

19. The computing system of claim 18, wherein the computer-readable storage medium comprises further instructions that when executed by the processor cause the processor to perform steps including:

responsive to determining that the additional count is greater than the threshold value, sending a notification to each of the clients executing the at least one protection application to adjust a scanning frequency of malware detection applications.

20. The computing system of claim 16, wherein mapping the detection event to the client state comprises:

determining the geolocation associated with the client based on a client identifier indicated by the client information; and storing, in the detections database, an association between the new detection event and the geolocation.

* * * * *